(12) United States Patent
Matsuoka

(10) Patent No.: US 10,215,107 B2
(45) Date of Patent: Feb. 26, 2019

(54) DISPLAY DEVICE

(71) Applicant: NISSAN MOTOR CO., LTD., Yokohama-shi, Kanagawa (JP)

(72) Inventor: Kazuya Matsuoka, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/748,457

(22) PCT Filed: Jul. 30, 2015

(86) PCT No.: PCT/JP2015/071573
§ 371 (c)(1),
(2) Date: Jan. 29, 2018

(87) PCT Pub. No.: WO2017/017827
PCT Pub. Date: Feb. 2, 2017

(65) Prior Publication Data
US 2018/0202371 A1 Jul. 19, 2018

(51) Int. Cl.
| | | |
|---|---|---|
| F02B 75/32 | (2006.01) | |
| F02D 15/02 | (2006.01) | |
| B60K 35/00 | (2006.01) | |
| F02D 29/02 | (2006.01) | |
| G07C 5/08 | (2006.01) | |
| B60K 37/02 | (2006.01) | |

(52) U.S. Cl.
CPC .............. *F02D 15/02* (2013.01); *B60K 35/00* (2013.01); *F02D 29/02* (2013.01); *G07C 5/0816* (2013.01); *B60K 37/02* (2013.01); *B60K 2350/1092* (2013.01); *B60K 2350/2008* (2013.01)

(58) Field of Classification Search
CPC ........ F02D 15/02; F02D 29/02; G07C 5/0816; B60K 35/00; B60K 37/02; B60K 2350/1092; B60K 2350/2008
See application file for complete search history.

(56) References Cited

U.S. PATENT DOCUMENTS

| | | | |
|---|---|---|---|
| 7,360,513 B2 | 4/2008 | Takemura et al. | |
| 8,502,654 B2 | 8/2013 | Gee et al. | |

(Continued)

FOREIGN PATENT DOCUMENTS

| | | |
|---|---|---|
| CN | 102189932 A | 9/2011 |
| JP | 2005-30222 A | 2/2005 |

(Continued)

*Primary Examiner* — Hung Q Nguyen
(74) *Attorney, Agent, or Firm* — Foley & Lardner LLP

(57) ABSTRACT

A display apparatus includes: a variable compression ratio mechanism which is capable of modifying an engine compression ratio of an internal combustion engine and a display displaying a state of a present engine compression ratio. For example, when a driving at an engine compression ratio with a good fuel economy is carried out, a display switching is not unnecessarily carried out even under a vehicular acceleration and the display can cause a driver to be recognized that the driving is carried out in a good fuel economy state. On the other hand, when the driving state is switched from the driving state of good fuel economy to that of a bad fuel economy due to an abrupt depression of an accelerator pedal, the display of the engine compression ratio is accordingly varied.

6 Claims, 4 Drawing Sheets

(56) References Cited

U.S. PATENT DOCUMENTS

| | | | |
|---|---|---|---|
| 2005/0228556 A1 | 10/2005 | Kojima | |
| 2011/0241864 A1 | 10/2011 | Fujiki et al. | |
| 2015/0217684 A1* | 8/2015 | Frens | G01D 11/28 |
| | | | 362/23.14 |
| 2016/0288705 A1* | 10/2016 | Henon | G02B 27/01 |

FOREIGN PATENT DOCUMENTS

| | | |
|---|---|---|
| JP | 2005-300272 A | 10/2005 |
| JP | 2006-226133 A | 8/2006 |
| JP | 2010-85483 A | 4/2010 |
| JP | 2011-257429 A | 12/2011 |
| JP | 2013-103574 A | 5/2013 |
| JP | 2015-21410 A | 2/2015 |
| WO | WO-2014/196445 A1 | 12/2014 |
| WO | WO 2014/196445 A1 | 12/2014 |

* cited by examiner

DISPLAY DEVICE

TECHNICAL FIELD

The present invention relates to a display apparatus used in a transport machine having a variable compression ratio mechanism which is capable of modifying an engine compression ratio.

BACKGROUND ART

A patent document 1 discloses a technology such that an instantaneous fuel consumption in a short period of time is calculated on a basis of a traveled distance of a vehicle (or a mobile body) and a fuel consumption (economy) determined on a basis of a vehicle speed and this instantaneous fuel consumption is displayed on a display.
Pre-Published Document
Patent Document 1: A Japanese Patent Application First (Laid-open) Publication No. 2011-257429.

DESCRIPTION OF INVENTION

Problem to be Solved by the Invention

However, since the above-described instantaneous fuel consumption is complicatedly (numerously) varied in accordance with accelerator operations and a variation of a vehicle speed, the variation of the fuel consumption is displayed even in a case where an engine load and an engine rotation number (engine rotation speed) are slightly varied toward a fuel consumption worsening direction in accordance with the accelerator operations at that time even if a driving in a good fuel consumption (economy) driving region is actually carried out. Thus, a possibility such that an unpleasant feeling is given to the driver and the driver is erroneously recognized that the driving at a bad fuel consumption (economy) is carried out occurs.

Means for Solving Problems

In view of such a circumstance as described above in mind, it is an object of the present invention to provide a display apparatus used for a transport machine having a variable compression ratio mechanism which is capable of modifying a variable compression ratio of the internal combustion engine, the display apparatus comprising a display displaying a state of the engine compression ratio.

In general, since the engine compression ratio is not set in a detailed manner in accordance with an engine load and an engine rotation number (speed) as compared with, for example, an engine demand torque, a fuel injection quantity, and so forth, the engine compression ratio is not so varied even if the engine load or the engine rotation number (speed) is slightly varied. That is, the display of the engine compression ratio is not varied even if the engine load or the engine rotation number (speed) is slightly varied. For example, if a driving at a good fuel consumption (economy) compression ratio is carried out, the display is not changed unnecessarily even during an acceleration of the vehicle. Thus, the driver can be continued to be recognized that the driving is carried out in the good fuel consumption (economy) driving state.

On the other hand, for example, when the driving state is changed from the good fuel consumption (economy) driving state to the bad fuel consumption (economy) driving state due to, for example, an abrupt depression of an accelerator pedal, the engine compression ratio is accordingly varied and the display of the engine compression ratio is varied. Thus, an excessive depression of the accelerator pedal can be recognized to the driver who keeps in mind to carry out the good fuel consumption (economy) driving.

Effect of Invention

According to the present invention, the state of the engine compression ratio can be represented to the driver so that the driver can recognize the state of the engine compression ratio.

EMBODIMENT FOR CARRYING OUT THE INVENTION

Figure 1:
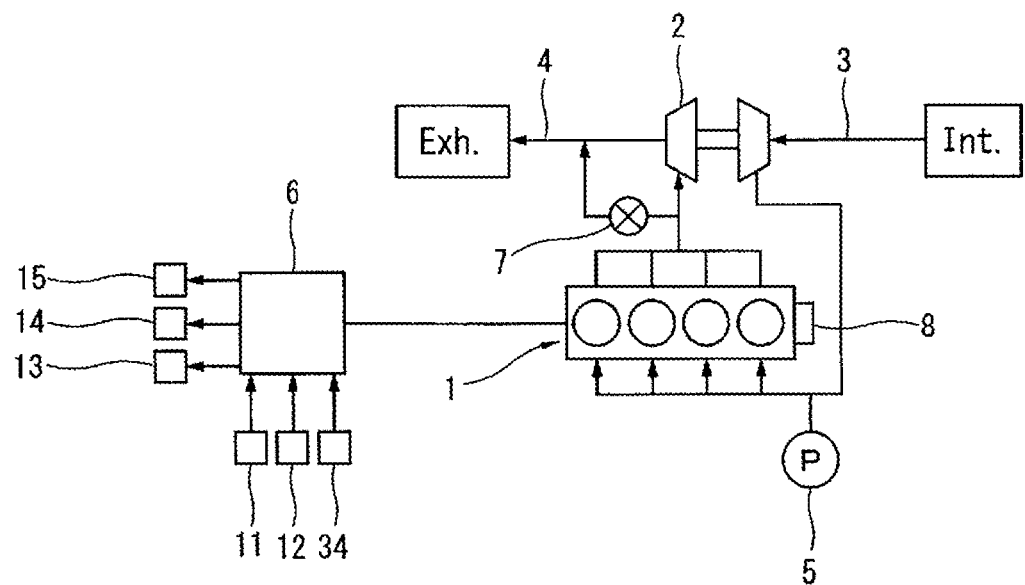
FIG. 1 is a rough configuration view representing an internal combustion engine in which a turbo charger related to a preferred embodiment according to the present invention is equipped.

Hereinafter, the present invention will be described in terms of a preferred embodiment shown in drawings. As shown in FIG. 1, a turbo charger 2 which supercharges intake air utilizing an exhaust energy is interposed between an exhaust passage 4 and an intake passage 3 in an internal combustion engine 1 for a vehicle to which the preferred embodiment according to the present invention is applied. An output of internal combustion engine 1 is gear-shifted by an automatic transmission 8 and is transmitted to driving wheel(s).

A control section 6 has a function to store and execute various types engine controls and outputs control signals to a throttle valve 13, a fuel injection valve 14, ignition plugs 15, and so forth on a basis of signals inputted from an engine rotation number sensor 11, an atmospheric pressure sensor 12 detecting an atmospheric pressure at an upstream side of a throttle, and so forth so as to control a throttle opening angle, a fuel injection quantity, an ignition timing, and so forth. In addition, control section 6 adjusts an opening angle of an exhaust bypass valve 7 as a supercharging pressure (a boost pressure) adjustment mechanism to control the supercharging pressure to a desired target supercharging pressure on a basis of the supercharging pressure (boost pressure) detected by a supercharging pressure sensor 5.

Figure 2:
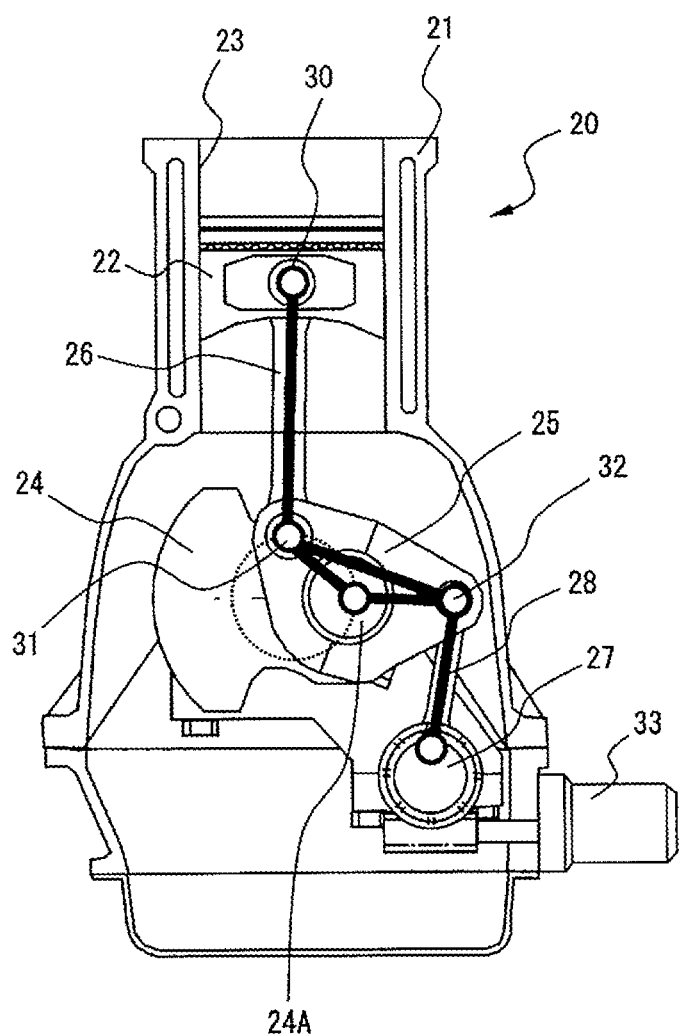
FIG. 2 is a rough configuration view representing a variable compression ratio mechanism related to the preferred embodiment described above.

FIG. 2 shows a variable compression ratio mechanism 20 utilizing a double link type piston-crank mechanism. It should be noted that, since this mechanism is well known as described in a Japanese Patent Application Laid-open Publication No. 2006-226133 and so forth, only a brief outline of this mechanism will herein be given. In a cylinder block 21 constituting a part of an engine main frame of the internal combustion engine, a piston 22 of each cylinder is slidably fitted into a corresponding one of cylinders 23 and a crankshaft 24 is rotatably supported by cylinder block 21. Variable compression ratio mechanism 20 includes: a lower link 25 rotatably attached to a crank pin 24A of crankshaft 24; an upper link 26 linking this lower link 25 and piston 22; a control shaft 27 rotatably supported at an engine main frame side of cylinder block 21, and so forth; and a control link 28 linking a control eccentric shaft section disposed eccentrically to control shaft 27 and lower link 25. Piston 22 and an upper end of upper link 26 are relatively rotatably linked via a piston pin 30. A lower end of upper link 26 and lower link 25 are relatively rotatable via a first linkage pin 31 and an upper end of control link 28 and lower link 25 are relatively rotatably linked via a second linkage pin 32. A lower end of control link 28 is rotatably attached to a control eccentric shaft section of control shaft 27.

A drive motor 33 is linked to control shaft 27 as an actuator. This drive motor 33 causes a rotation position of control shaft 27 to be modified and held so that, in association with a change in posture of lower link 25, a piston stroke characteristic including a piston upper dead center and a piston bottom dead center is varied and the mechanical compression ratio is accordingly varied. Hence, by drivingly controlling drive motor 33 through above-described control section 6 (refer to FIG. 1), the mechanical compression ratio can be controlled in accordance with an engine driving condition. Specifically, as a device for detecting an actual mechanical compression ratio modified by variable compression ratio mechanism 20, a control shaft sensor 34 (refer to FIG. 1) detecting a rotation position of control shaft 27 corresponding to this actual compression ratio is disposed. Control section 6 performs a feedback control of drive motor 33 in order to maintain an actual compression ratio in proximity of a target compression ratio on a basis of the actual compression ratio detected by control shaft sensor 34.

Figure 3:
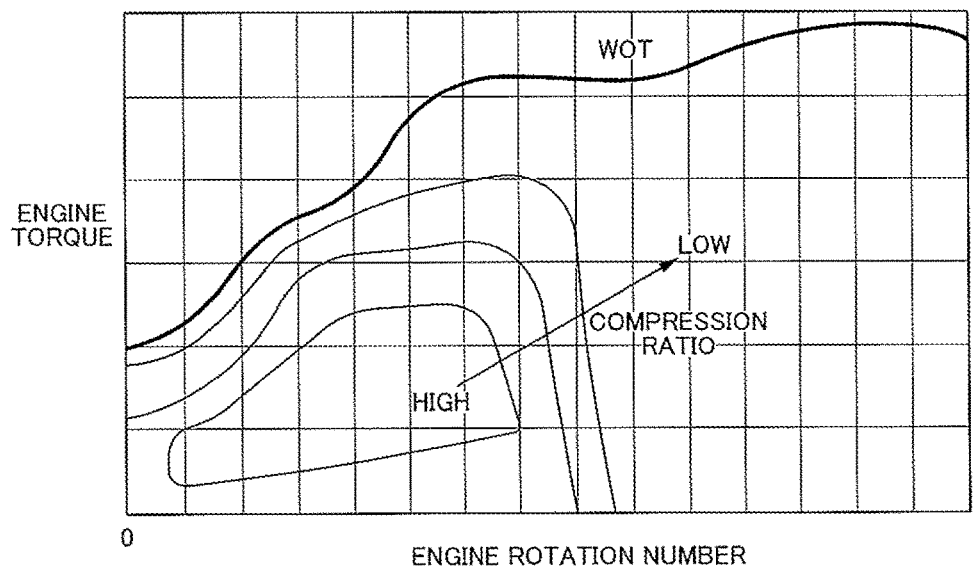
FIG. 3 is an explanatory view representing a setting map of an engine compression ratio.

FIG. 3 shows an explanatory view representing a setting map of the engine compression ratio (a target compression ratio). As shown in FIG. 3, the engine compression ratio is set on a basis of an engine torque, namely, the engine load and the engine rotation number (speed).

As the engine load becomes lower or as the engine rotation number (engine speed) becomes lower, the engine compression ratio is set to be higher in order to achieve an improvement in the fuel economy (consumption) caused by an improvement in a thermal efficiency. On the other hand, as the engine load becomes higher or the engine rotation number (engine speed) becomes higher, the engine compression ratio is set to be lower in order to suppress generations of knockings and pre-ignitions. In other words, as the engine load or the engine rotation number (speed) becomes higher, the engine compression ratio becomes lower.

Figure 4A:
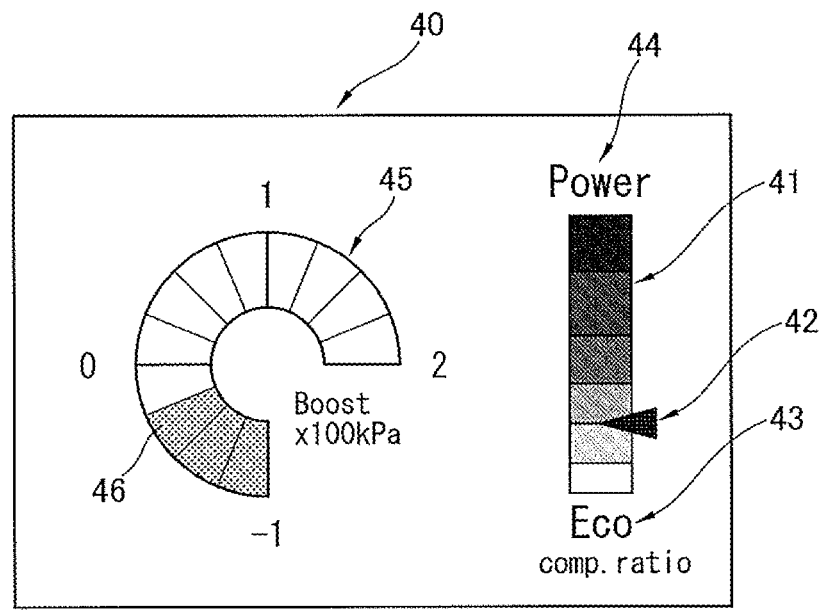
FIGS. 4(A) and 4(B) are explanatory views representing a display indicating a state of the engine compression ratio, FIG. 4(A) being a high compression ratio state and FIG. 4(B) being a low compression ratio state.
Figure 4B:
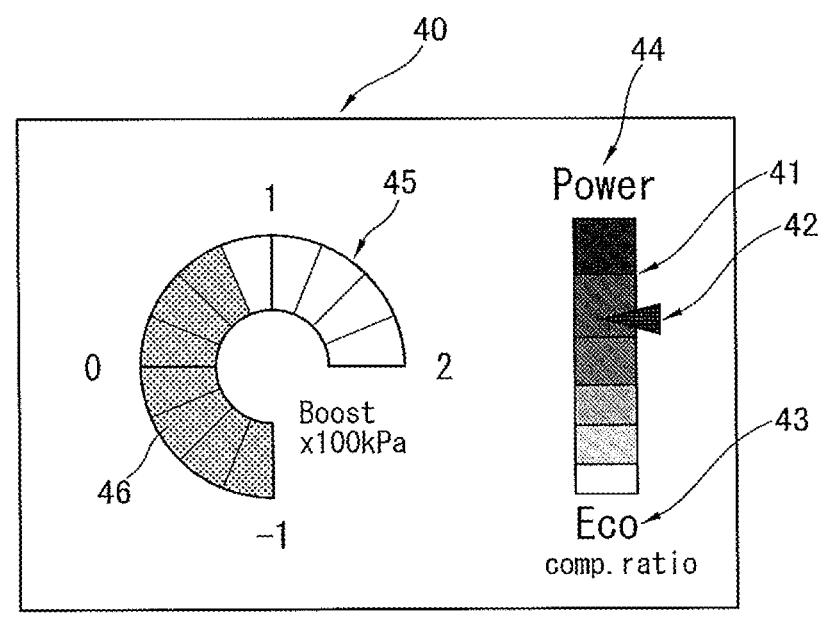

FIGS. 4(A) and 4(b) show explanatory views representing display 40 constituting the display apparatus related to the preferred embodiment.

This display 40 is arranged at a position which can visually be recognized by the driver. Display 40 is, for example, is arranged at an instrument panel or dashboard placed in front of the driver and is used in common use with a display for a navigation system. The control signals of the actual compression ratio detected by control shaft sensor 34 and the supercharging pressure (boost pressure) detected by supercharging pressure sensor 5 are inputted from control section 6.

A compression ratio (Comp. ratio) display section 41 (Comp. ratio) is, for example, formed of a bar graph shape of a plurality of stages in an elongated direction as shown in FIGS. 4(A) and 4(B) in which a cursor 42 is moved in a vertical direction of compression ratio display section 41. This cursor represents a state of the present engine compression ratio. This cursor 42 moves toward a lower side as the engine compression ratio becomes a higher compression ratio and moves toward an upper side as the engine compression ratio becomes a lower compression ratio. It should herein be noted that economical representing characters (Eco) 43 are displayed (marked) at a lower side of compression ratio display section 41 representing a saving of energy in order for a driver to understand that the fuel consumption (economy) is improved by improving a thermal efficiency and the driving is carried out in an energy saving state, as the engine compression ratio becomes the higher compression ratio, and high output characters 44 (Power) are displayed (marked) representing a high output at an upper side of compression ratio display section 41 in order for the driver to understand that the engine becomes the higher output, as the engine compression ratio becomes the lower compression ratio. Furthermore, a color tone of a hierarchy within compression ratio display section 41 is modified in order to easily facilitate a state of the engine compression ratio. For example, as the cursor moves toward the more upper side (the lower compression ratio side), a color tone becomes nearer to red to associate the high output and, as the cursor moves toward the more lower side (higher compression ratio side), the color tone becomes nearer to green to associate the saving of energy. In this way, the color tone is modified in a stepwise manner.

It should also be noted that, on this display 40, a supercharging pressure display section 45 is juxtaposed to display section 41 which displays the state of the engine compression ratio. Supercharging pressure display section 45 is a meter in a circular graph-like state of a plurality of stages. As the supercharging (boost) pressure becomes raised, a light-emitting section 46 is extended in a circumferential direction of a clockwise direction. As the supercharging (boost) pressure becomes lowered, light-emitting section 46 is shrunk in the circumferential direction of a counterclockwise direction. On this meter, a scale of "−1", "0", "1", and "2" is displayed (marked) in a sequence of the clockwise direction. "0" indicates a pressure corresponding to the atmospheric pressure. "−1" is a pressure of −100 kPa (negative pressure), "1" is a pressure of 100 kPa, and "2" is a pressure of 200 kPa. In this embodiment, since both of turbo charger 2 and variable compression ratio mechanism 20 are used together with each other, it becomes possible to increase sufficiently the supercharging (boost) pressure up to 200 kPa at the low compression ratio side. By displaying the supercharging (boost) pressure with supercharging pressure display section 45, a high output state is emphasized and can be recognized through display 40.

It should be noted that FIG. 4(A) shows the state of a high compression ratio and a low supercharging (boost) pressure and FIG. 4(B) shows another state of a low compression ratio and a high supercharging (boost) pressure.

In this embodiment described above, variable compression ratio mechanism 20 which is capable of modifying the engine compression ratio of the internal combustion engine is installed and display 40 which displays the state of the present engine compression ratio is installed. Since, in general, the engine compression ratio is not set in a (more) detailed manner excessively in accordance with the engine load and the engine rotation number (speed), the compression ratio is not varied even when the engine load or the engine rotation number (speed) is slightly varied. That is, the display of the engine compression ratio is not frequently switched. Hence, if the driving is carried out at the compression ratio giving a good fuel economy, the driver can be made recognized that the driving of saving the energy is carried out even under the vehicular acceleration. Thus, for the driver who takes good care to save the energy, an excessively deep depression of the accelerator pedal can be suppressed.

[2] In addition, when the engine load of the internal combustion engine is low or the engine rotation number (speed) is low, the compression ratio is made high in order to improve the thermal efficiency of the engine and improve the fuel consumption (economy).

[3] Then, the display representing the energy saving is provided at the high compression ratio side of compression ratio display section 41. Hence, the driver is conscious of not being deviated from the display associating the saving of energy (economic driving) taking good care to operate the accelerator (pedal) so that the driving with the good fuel consumption (economy) can be carried out.

[4] When the engine load is high or the engine rotation number (speed) is high, the engine compression ratio is lowered in order to suppress the generation of the knockings and the pre-ignitions.

[5] Then, when the display representing the high output is installed at the low compression ratio side of compression ratio display section 41. Thus, the driver can be recognized from the display that the driving is carried out in the driving state of high output. In addition, in a case where such a high output driving state as described above is different from an intention of the driver, the driver is allowed to shallow the depression depth of the accelerator (a narrow opening angle of the accelerator).

[6] In addition, in this embodiment, turbo charger 2 which supercharges intake air is installed and supercharging pressure display section 45 is installed displaying the supercharging state in addition to the state of the engine compression ratio. In this way, in a case where variable compression ratio mechanism 20 and turbo charger 2 are used in combination with each other, it becomes possible to sufficiently increase the supercharging (boost) pressure up to about 200 kPa at the low compression ratio side. The high output state can be recognized to the driver with emphasize by a simultaneously display of supercharging pressure display section 45.

As described hereinabove, the present invention has been explained on a basis of the preferred embodiment. However, the present invention is not limited to the above-described embodiment. Various changes and modifications can be included. For example, display forms of the compression ratio and the supercharging (boost) pressure are not limited to the above-described embodiment. For example, other display forms such as analog indicators or so forth may be used. In addition, the state of the present engine compression ratio is detected by a control shaft sensor and is displayed through the display. However, alternatively, a target compression ratio set from the engine load, the engine rotation number (speed), and so forth may be displayed. Furthermore, in this embodiment, the state of the engine compression ratio is represented by the movement of the cursor. Alternatively, the light emission of the engine compression ratio in the same way as the supercharging pressure display section may be displayed. Furthermore, an example of the application of the vehicle as the transport machine has been explained, the present invention is applicable to an aircraft, a vessel, or so forth.

EXPLANATION OF SIGNS

1 . . . internal combustion engine
2 . . . turbo charger
7 . . . exhaust bypass valve (supercharging pressure adjustment mechanism)
8 . . . automatic transmission
20 . . . variable compression ratio mechanism
34 . . . control shaft sensor

The invention claimed is:

1. A display apparatus used for a transport machine equipped with a variable compression ratio mechanism which is capable of modifying an engine compression ratio of an internal combustion engine, comprising: a display displaying a degree of a saving of energy which varies in accordance with a state of the engine compression ratio; and a mark disposed in the proximity to the display to represent that the display indicates the state of the engine compression ratio.

2. The display apparatus as claimed in claim 1, which further comprises a control section configured to raise the engine compression ratio when an engine load is low or an engine rotation speed is low.

3. The display apparatus as claimed in claim 1, wherein the display includes a display section on which a representation is varied in accordance with the state of the engine compression state and a mark representing a saving of energy at a high compression ratio side of the display section.

4. The display apparatus as claimed in claim 1, which further comprises a control section configured to lower the engine compression ratio when an engine load of the internal combustion engine is high or an engine rotation speed thereof is high.

5. The display apparatus as claimed in claim 1, wherein the display includes a display section whose display is varied in accordance with the state of the engine compression ratio and wherein a mark representing a high output is disposed at a low compression side of the display section.

6. The display apparatus as claimed in claim 1, which further comprises a supercharger supercharging intake air and wherein the display displays a supercharging state together with the state of the engine compression ratio.

* * * * *